UNITED STATES PATENT OFFICE.

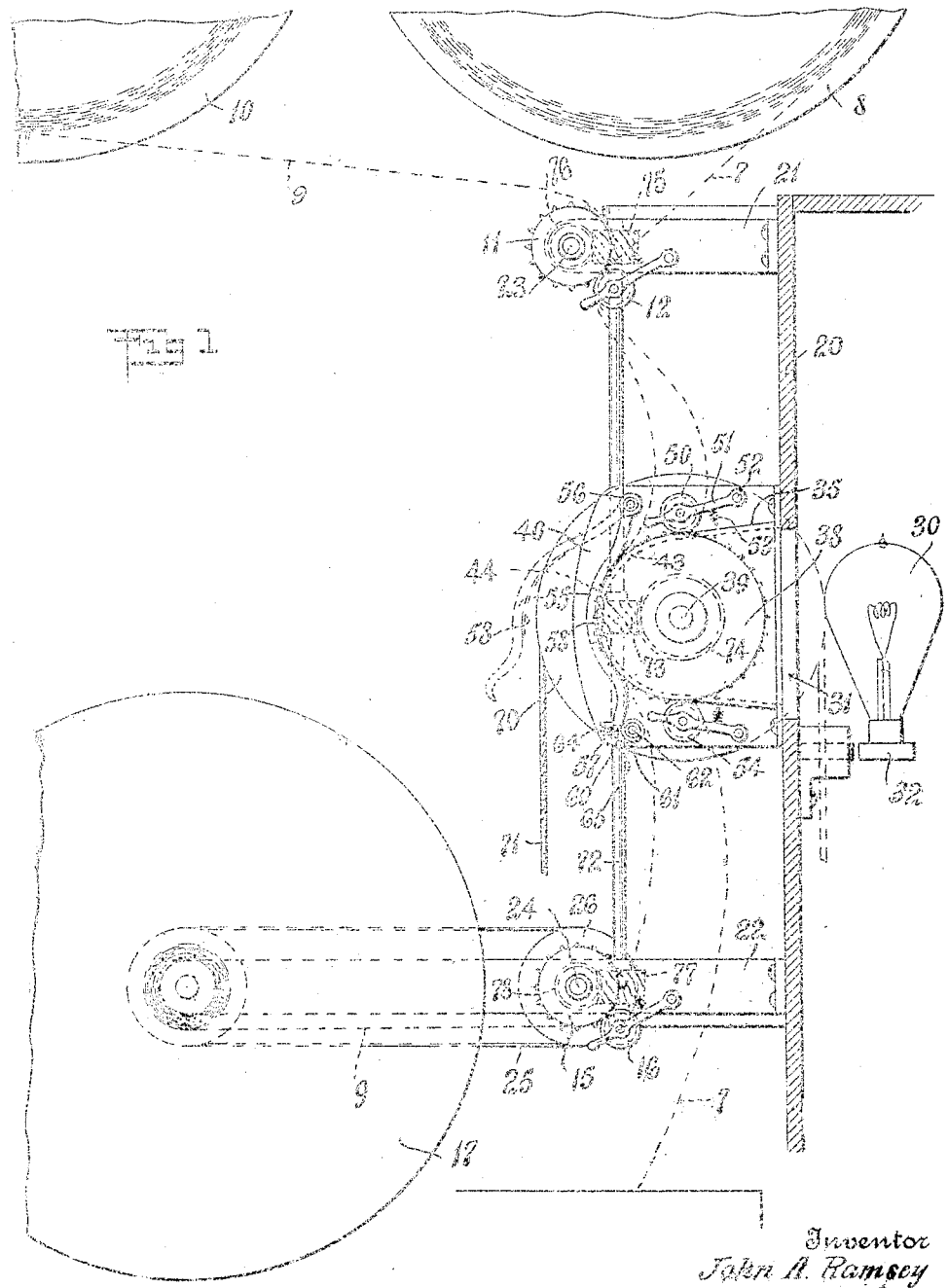

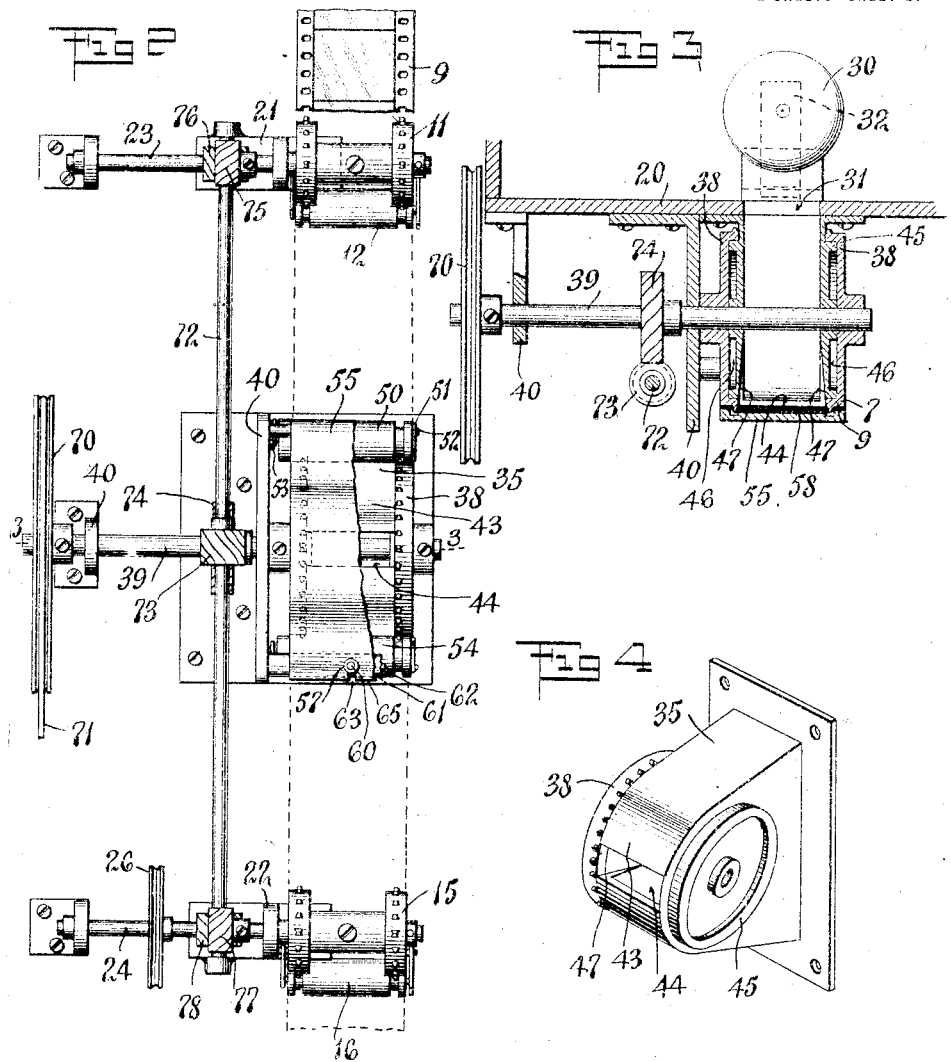

JOHN A. RAMSEY, OF NEW YORK, N. Y.

FILM-PRINTING MACHINE.

1,212,259.   Specification of Letters Patent.   Patented Jan. 16, 1917.

Application filed December 29, 1915.   Serial No. 69,136.

*To all whom it may concern:*

Be it known that I, JOHN A. RAMSEY, a citizen of the United States of America, residing at New York, N. Y., have invented a new and useful Film-Printing Machine, of which the following is a specification.

The general objects of my present invention are to enable the rapid, accurate printing of motion picture films.

Another object is to provide a machine capable of such work which will be free of complications and which can be readily and successfully operated without requiring the exercise of any particular skill or the necessity of any previous training.

In the accomplishment of these and other objects I employ a movable support for transporting the film past a source of light and I provide means for first placing the inner or under strip of film on said support and thereafter superposing the second film strip on top of said first previously placed and relatively fixed film strip. As a support for the film I preferably employ a sprocket having its periphery or a portion of its periphery disposed in the plane of the printing aperture so as to carry the section of supported film across said printing aperture. A pressure or backing plate is usually provided for holding the superposed layers of film traversing the printing aperture. This pressure plate may be utilized as a part of the means for placing or superposing the second film strip on the first film strip and a simple form of guide roller, located in front of the pressure plate, may be provided for placing the first film strip on the supporting sprocket in advance of the second film strip.

Other features of the invention and details of construction will appear as the specification proceeds, attention being directed to the accompanying drawings wherein is illustrated a practical and preferred form of the invention.

In the drawings: Figure 1, is a view in side elevation of a machine constructed in accordance with and embodying the invention, parts being shown broken away. Fig. 2, is a view of the rear side of the machine shown in Fig. 1. Fig. 3, is a horizontal sectional view taken substantially on the plane of the line 3—3 of Fig. 2. Fig. 4, is a detail perspective view of the light casing and one of the film supporting sprocket wheels.

In the machine herein illustrated the strip of negative film 7 is supplied from a reel 8 and the strip of sensitized film 9, which, after printing, becomes the positive, is supplied from a reel 10. These two film strips are brought together at the feeding out sprocket 11, on which they may be held by a spring pressed roll 12. After going through the printing operation the printed film is in the illustration taken up by a take-up sprocket 15, against which it is held by a spring pressed roller 16, and wound on a take-up reel 17. These several feeding devices and the mechanism which supports the film at the printing point are all usually housed in a casing, the front wall of which is indicated at 20. This front wall is utilized also in the illustration as a baseboard supporting the brackets 21 and 22 in which the shafts 23 and 24 of the feeding out and take-up sprockets respectively are mounted. The take-up reel is usually positively driven as by means of a belt 25 engaged over a pulley 26 on the take-up sprocket shaft 24.

30 designates a suitable light source, disposed in front of the window or printing opening 31 in the front wall of the casing and carried in the present instance by a support 32 which can be moved toward or away from the window for the purpose of increasing or decreasing the intensity of the light.

The light passes from the light source through the window 31 in the casing and into a housing 35 at the inner end of which the film being printed is supported.

According to the at present preferred form of my invention the film being printed is supported by a sprocket of about double the size of the usual film feeding sprocket and consisting of two sprocket wheels 38 located just outside the sides of the light housing 35 and spaced apart a distance corresponding to the width of the picture being printed. In the particular form shown these sprocket wheels are mounted on a shaft 39 passing through the light housing 35 and journaled in the brackets 40 carried by the base plate 20.

The end walls of the light housing 35 is shown rounded at 43 to substantially correspond to the curvature of the film sections being printed on the supporting sprocket and is further shown provided with an aperture 44 admitting the beam of light to the film.

To provide a light trap the side walls of the housing 35 are in the illustration bossed or flanged outwardly as indicated at 45 and the inner opposing faces of the sprocket wheels are recessed or countersunk as indicated at 46 to fit over such outwardly flanged portions. At the printing aperture this light trap is cut away as indicated at 47 to enable the printing of the full space between the sprocket wheels.

The first or inside film strip 7 is directed to and positioned upon the supporting sprocket at a point some distance in advance of the printing aperture by a guide which here takes the form of a roller 50 carried by an arm 51 which is pivoted at 52 and normally forced toward the supporting sprocket by a spring 53. At the leaving side of the sprocket this film strip is guided and controlled by a guide roller 54 similar to the one just described. By these means the first film strip is laid upon the supporting sprocket and held firmly thereon.

The second or outer film strip 9 is not applied until after the first inner film strip has been applied to the supporting sprocket and is firmly held thereon. In other words the inner film strip is first fixed upon the supporting sprocket and thereafter the second film strip is applied to this relatively fixed film strip.

The means for thus subsequently applying the second film strip comprises in the machine illustrated, a pressure or backing plate 55 pivoted at 56 and held in yielding engagement over the outside film strip by a spring pressed button 57. This spring pressed plate is curved to conform to the curvature of the film strip being printed and may be faced with velvet or the like material as indicated at 58 to prevent scratching or injuring the film.

The strips of film advanced by the feeding out sprocket are usually allowed to bulge out as indicated at Fig. 1 to provide plenty of slack and to permit of the placing of the first film strip on the sprocket in advance of the second strip and ready to have the second strip superposed thereon. This laying on effect is clearly illustrated in Fig. 1 where it will be seen that the guide roller 50 operates to lay the inner film strip on the sprocket at a point in advance of the printing aperture and that the backing plate disposed in rear thereof, as concerns the direction of rotation, operates to superpose the second film strip on top of the first film strip, after the first film strip has been firmly fixed upon and is moving forward positively with the sprocket. This it will be evident prevents any slippage and maintains a uniform absolute register of the pictures being printed. In practice the negative strip is usually placed next the sprocket wheel and the positive film strip is superposed on top of the negative strip.

The construction of the yielding holding button 57 will be clear from Figs. 1 and 2 in which it will be seen that this button is mounted on a stud 60 secured to a sleeve 61 rotatably engaged on the pivot stud 62, the button stud 60 working in a slot 63 in the lower end of the pressure plate and the button being acted upon by a spring 64 coiled about the stud 60. The lower end of the pressure plate may be made wedge shaped or in the form of a cam as indicated at 65 so that the spring button will readily engage thereover.

The driving of the several parts of the machine is accomplished in the illustration, by mounting a drive pulley 70 on one end of the supporting sprocket shaft 39 with which engages a driving belt 71 and by operating the feeding off and take-up sprockets through gearing from a shaft 72 which is geared to the sprocket shaft 39. This connecting shaft 72 is shown connected with the supporting sprocket shaft 39 by spiral gears 73 and 74, with the feeding off sprocket shaft by spiral gears 75 and 76 and with the take-up sprocket shaft by spiral gears 77 and 78. The parts are by these simple means all driven in proper time and proper synchronism.

A special advantage which my invention possesses is that by reason of the simple construction and the holding of the superposed film firmly and without slipping, the machine may be operated continuously and at as high a rate of speed as the density of the film will permit.

Another and very important advantage possessed by my invention is that any differences in the perforations in the two films are automatically compensated for at the printing point. This advantage will be more fully appreciated when it is realized that in the development of the negative film shrinkage very frequently occurs. With my invention this shrinkage will have no effect upon the printing on the unshrunk positive strip of film, because the negative film is first laid upon the supporting sprocket so as to in effect constitute a part of the surface of said sprocket and thereafter the positive strip is simply engaged over this supplementary supporting surface and moves along with the same past the printing point.

What I claim is:—

1. In a machine of the character described, the combination with a light source, of a film support arranged to support superposed sections of negative and positive films in printing relation to said light source and movable to carry fresh sections of films into printing relation, means for disposing one of the films on said film support at a point in advance of the printing point and means for superposing the second film on said first previously placed film at a point between the printing point and the point where the first film is placed on the film support, whereby said second film is placed on a relatively fixed section of film and relative movement between the contacting sections of film is thereby avoided.

2. In a machine of the character described, the combination with a light source, of a film support arranged to support superposed sections of negative and positive films in printing relation to said light source and movable to carry fresh sections of films into printing relation, means for disposing one of the films on said film support at a point in advance of the printing point, means for superposing the second film on said first previously placed film at a point between the printing point and the point where the first film is placed on the film support, whereby said second film is placed on a relatively fixed section of film and relative movement between the contacting sections of film is thereby avoided, and means for operating the film support to advance fresh sections of films to the printing point.

3. In a machine of the character described, the combination with a light source, of a rotatably mounted film support arranged to support superposed sections of negative and positive films in printing relation to said light source, means for disposing one of the films on said film support at a point in advance of the printing point, and means for superposing the second film on said first previously placed film at a point between the printing point and the point where the first film is placed on the film support.

4. In a machine of the character described, the combination with a light source, of a rotatably mounted film support arranged to support superposed sections of negative and positive films in printing relation to said light source, means for disposing one of the films on said film support at a point in advance of the printing point, means for superposing the printed film on said first previously placed film at a point between the printing point and the point where the first film is placed on the film support, and means for rotating the rotatable film support to advance fresh sections of film to the printing point.

5. In a machine of the character set forth, the combination of a movably mounted film support arranged to support strips of film in superposed relation, means for disposing the inner film strip on said support at one point and means for superposing the second film strip on the first previously placed film strip at a point in rear of the point where the first film strip is placed on the film support considering the direction of movement of the film support.

6. In a machine of the character described, the combination of a rotatable film support, a guide for directing the film onto said support and a second guide disposed in rear of the first guide and arranged to direct a second film on top of the previously placed film on the film support.

7. In a machine of the character set forth, a film supporting sprocket, a light source disposed in printing relation to said sprocket, a guide for directing a film strip onto the periphery of said sprocket at a point in advance of the printing point and a second guide disposed in rear of the first guide and between said first guide and the printing point arranged to place a second film strip on top of the first previously placed strip.

8. In a machine of the character set forth, a light housing having a printing aperture in the end thereof, sprocket wheels at the sides of said housing having portions of their peripheries in the plane of said light aperture, means for guiding a film strip onto the sprocket wheels at a point to one side of the light aperture and means for guiding a second film strip on top of the first previously placed film strip at a point between the light aperture and said first guiding means.

9. In a machine of the character set forth, a light housing having a printing aperture in the end thereof, sprocket wheels at the sides of said housing having portions of their peripheries in the plane of said light aperture, means for guiding a film strip onto the sprocket wheels at a point to one side of the light aperture, means for guiding a second film strip on top of the first previously placed film strip at a point between the light aperture and said first guiding means, and a pressure plate yieldingly bearing on the superposed films crossing the light aperture.

10. In a machine of the character set forth, a light source, a film supporting sprocket arranged in printing relation to said source, means for disposing a film strip on said supporting sprocket at a point in advance of the printing point, means for superposing a second film on said first previously placed film strip at a point between the printing point and the point where the first film strip is placed on the sprocket and means for continuously rotating said sprocket.

11. In a machine of the character set forth, a light housing having a relatively fixed curved wall at one end thereof provided with a printing aperture therein, a shaft extending through said housing between the side walls thereof, sprocket wheels fixedly secured on said shaft outside the side walls of the light housing having their peripheral portions in substantial alinement with the outer surface of the end wall, the side walls of said light housing being separated at the printing aperture substantially the full-width of the space between the sprockets whereby to permit of printing substantially the full-width of a film strip supported on said sprocket wheels and said curved end wall and a light trap between the sprocket wheels and the outer sides of the light housing.

12. A film printing machine comprising a film supporting sprocket arranged in printing relation to a suitable source of light, means for applying and holding a predetermined length of film strip on said sprocket, thereby causing such length of film strip to travel as a unit with said supporting sprocket and means for superposing and holding a lesser length of film strip on the aforesaid held length of first film strip between the ends of said supported and held portion of the first film strip.

13. In a machine of the character described, a light housing having an open front end and a curved wall at its opposite end provided with printing aperture therein, external outstanding annular flanges on the side walls of the housing and oppositely disposed film supporting sprocket wheels recessed in their opposing faces and fitting over said flanges on the sides of the housing.

14. In a machine of the character described, a light housing having an open front end and a curved wall at its opposite end provided with printing aperture therein, external outstanding annular flanges on the side walls of the housing, oppositely disposed film supporting sprocket wheels recessed in their opposing faces and fitting over said flanges on the sides of the housing and a light source adjustably supported at the open front end of said light housing.

15. A film printing machine comprising a film supporting sprocket, means for applying and holding a predetermined length of film strip on said sprocket, thereby causing such length of film strip to travel as a unit with said supporting sprocket, means for superposing and holding a lesser length of film strip on the aforesaid held length of first film strip between the ends of said supported and held portion of the first film strip and a light source adjustably mounted in printing relation to said supporting sprocket.

16. A film printing machine comprising a supporting sprocket disposed in printing relation to a suitable light source, means for applying and holding a length of film strip on said sprocket and thereby causing such held length of film strip to travel with and constitute in effect a portion of the surface of said sprocket and means for superposing and holding a second length of film on top of the aforesaid film surface of the sprocket at points between the points where said first film strip is applied to and removed from the supporting sprocket whereby said length of superposed film strip is caused to travel as a unit with the previously applied length of first film strip on the sprocket.

17. A film printing machine comprising a film supporting sprocket arranged in printing relation to a suitable source of light, a guide roll arranged to guide and hold a strip of film upon said sprocket and means for applying and holding a second strip of film on top of the film strip first applied disposed in rear of said guide roll considering the direction of movement of the sprocket.

18. In a film printing machine the combination with a light source and a film supporting sprocket mounted in printing relation to said light source, of a backing plate arranged to hold a film strip upon said sprocket pivotally supported at one end, an abutment post arranged to be engaged by the opposite free end of said backing plate and a spring pressed holding button pivoted on said abutment post and adapted to be drawn outward and swung over the top of the free end of the backing plate bearing against said post.

JOHN A. RAMSEY.